(12) United States Patent
Van Berkel (10) Patent No.: US 7,339,381 B2
(45) Date of Patent: Mar. 4, 2008

(54) OBJECT SENSING

(75) Inventor: Cornelis Van Berkel, Hove (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 122 days.

(21) Appl. No.: 10/534,008

(22) PCT Filed: Oct. 30, 2003

(86) PCT No.: PCT/IB03/04823

§ 371 (c)(1),
(2), (4) Date: Feb. 15, 2006

(87) PCT Pub. No.: WO2004/044827

PCT Pub. Date: May 27, 2004

(65) Prior Publication Data

US 2007/0139049 A1 Jun. 21, 2007

(30) Foreign Application Priority Data

Nov. 12, 2002 (GB) ................... 0226404.2

(51) Int. Cl.
*G01N 27/60* (2006.01)
*G01R 27/26* (2006.01)
(52) U.S. Cl. .................. 324/452; 324/662; 324/663; 324/457; 340/561

(58) Field of Classification Search ............... 324/452, 324/457, 662, 663; 382/124; 340/561
See application file for complete search history.

(56) References Cited

U.S. PATENT DOCUMENTS

| 5,130,829 | A | 7/1992 | Shannon |
| 6,025,726 | A | 2/2000 | Gershenfeld et al. |
| 2003/0021078 | A1* | 1/2003 | van Berkel ............. 361/234 |
| 2004/0201384 | A1* | 10/2004 | Berkel ..................... 324/604 |

OTHER PUBLICATIONS

U.S. Appl. No. 10/153,261.

* cited by examiner

*Primary Examiner*—Vincent Q. Nguyen (57) ABSTRACT

An object sensing system (50), and method, employing electric field sensing, also known as quasi-electrostatic sensing and which may be termed cross capacitive sensing, is described. The system (50) includes at least one electrode arrangement (30), each electrode arrangement (30) includes one electric field sensing reception electrode (32) and two electric field sensing transmission electrodes (34, 36). One of the electric field sensing transmission electrodes (36) is driven with an alternating voltage (130) including at least some antiphase portions, for example an inverted signal, in comparison to an alternating voltage (120) with which the other electric field sensing transmission electrode (34) is driven. This improves the spatial precision of object sensing performed by detecting changes in the current induced in the electric field reception electrode (32). In one arrangement the two electric field sensing transmission electrodes (34, 36) are in the form of annular rings arranged around the electric field sensing reception electrode (32).

14 Claims, 7 Drawing Sheets

OBJECT SENSING

The present invention relates to object or feature sensing using electric field sensing. Electric field sensing is also known as quasi-electrostatic sensing, and may be termed cross capacitive sensing. The present invention is particularly suited to, but not limited to, fingerprint sensing.

Sensing technologies used for object sensing include capacitive sensing and electric field sensing, also known as quasi-electrostatic sensing, and which may be termed cross capacitive sensing. The use of electric field sensing to detect objects in 3-D space has been known for a long while, and is used for example in proximity sensors. In nature, the gnathomenu petersii fish uses electric field sensing to detect objects. In its very simplest form, capacitive sensing uses just one electrode and a measurement is made of the load capacitance of that electrode. This load capacitance is determined by the sum of all the capacitances between the electrode and all the grounded objects around the electrode. This is what is done in proximity sensing. Electric field sensing, which may be termed cross capacitance sensing, uses two electrodes, and effectively measures the specific capacitance between the two electrodes. The electrode to which electric field generating apparatus is connected may be considered to be an electric field sensing transmission electrode, and the electrode to which measuring apparatus is connected may be considered to be an electric field sensing reception electrode. The first (transmitting) electrode is excited by application of an alternating voltage. A displacement current is thereby induced in the second (receiving) electrode due to capacitive coupling between the electrodes (i.e. effect of electric field lines). If an object is placed near the electrodes (i.e. in the field lines) some of the field lines are terminated by the object and the capacitive current decreases. If the current is monitored, the presence of the object may be sensed.

U.S. Pat. No. 6,025,726 discloses use of an electric field sensing arrangement as, inter-alia, a user input device for computer and other applications. The electric field sensing arrangement senses the position of a user's finger(s), hand or whole body, depending on the intended application.

Arrangements such as those disclosed in U.S. Pat. No. 6,025,726 are limited as to the precision or sensitivity to which the position of the object may be sensed. The precision available is undesirably limited compared to a precision that would be desired or required for some applications, for example fingerprint sensing where separate sensing of the position of individual ridges of the fingerprint is required.

The present inventor has realised it would be desirable to provide an object sensing arrangement, employing electric field sensing, with a more localised positional sensing than is provided by conventional arrangements. This has lead to an analysis of the fundamental limitations of conventional arrangements, in terms of a sensitivity profile in terms of how the electric field sensing output falls off with a distance r, the distance r being the distance from an idealised receiver electrode. The assessment performed indicates that conventional arrangements, in the presence of a ground plane behind the transmitting and receiving electrodes, provide, at best, a sensitivity profile in which the electric field sensing output falls off with $1/r^6$.

In a first aspect, the present invention provides an object or feature sensing system employing electric field sensing, also known as quasi-electrostatic sensing and which may be termed cross capacitive sensing. The system comprises at least one electrode arrangement, each electrode arrangement comprising one electric field sensing reception electrode and at least two electric field sensing transmission electrodes. One (or, in the case of more than two electric field sensing transmission electrodes, one or more) of the electric field sensing transmission electrodes is (are) driven with an alternating voltage comprising at least some antiphase portions, for example an inverted signal or other form of signal characterised by comprising opposite polarity, in comparison to an alternating voltage with which the other electric field sensing transmission electrode is driven.

This tends to improve the spatial precision of object sensing performed when detecting changes in the current induced in the electric field reception electrode due to the presence of an object or feature.

In a preferred arrangement, the electric field sensing reception electrode is in the form of a solid or block shape (as opposed, for example, to an annular ring shape), the electric field sensing transmission electrodes are in the form of annular rings, and a first of the electric field sensing transmission electrodes is positioned around the electric field sensing reception electrode, and the second electric field sensing transmission electrode is positioned around the first electric field sensing transmission electrode (and in the case of a further one or more electric field sensing transmission electrodes, this or they are positioned around the respective preceding electric field sensing transmission electrode, and so on).

In one arrangement the two electric field sensing transmission electrodes are substantially in the form of annular rings arranged around the electric field sensing reception electrode which is substantially in the form of a filled in circle.

In a further aspect, the present invention provides methods of sensing objects comprising providing the above mentioned items and using them accordingly.

In particular, the present invention provides a method of sensing objects comprising providing at least one electrode arrangement, each electrode arrangement comprising one electric field sensing reception electrode and at least two electric field sensing transmission electrodes. The method further comprises driving one (or, in the case of more than two electric field sensing transmission electrodes, one or more) of the electric field sensing transmission electrodes with an alternating voltage comprising at least some antiphase portions, for example an inverted signal or other form of signal characterised by comprising opposite polarity, in comparison to an alternating voltage with which the other electric field sensing transmission electrode is driven.

Further aspects of the invention are as claimed in the claims.

The above described arrangements and methods tend to provide an increased extent of localised positional sensing compared to conventional arrangements. Improved sensitivity profiles tend to be provided, which in favourable examples may even offer increased localisation to the extent that the electric field sensing output falls off with $1/r^{12}$.

Embodiments of the present invention will now be described, by way of example, with reference to the accompanying drawings, in which.

Figure 1:
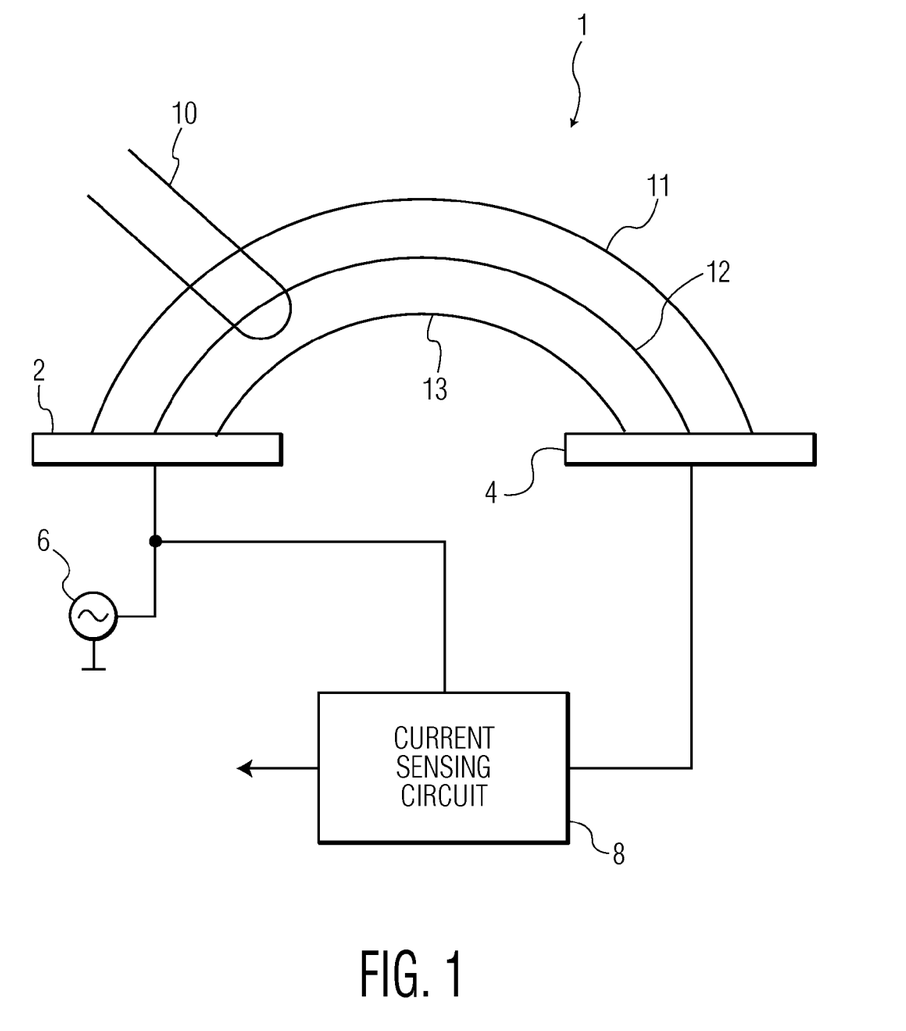
FIG. 1 shows a conventional electric field sensing system (not to scale)

First, an outline account will be given of the fundamental operation of a conventional electric field sensing arrangement. FIG. 1 shows a conventional electric field sensing system 1 (not to scale) comprising an electric field sensing transmission electrode 2, an electric field sensing reception electrode 4, an alternating voltage source 6, and a current sensing circuit 8.

The alternating voltage source 6 is connected to the electric field sensing transmission electrode 2 and the current sensing circuit 8. The current sensing circuit 8 is separately connected to the electric field sensing reception electrode 4.

In operation, when an alternating voltage is applied to the electric field sensing transmission electrode 2, electric field lines are generated, of which exemplary electric field lines 11, 12, 13 pass through the electric field sensing reception electrode 4. The field lines 11, 12, 13 induce a small alternating current which is measured by the current sensing circuit 8 (the current sensing circuit 8 uses a tapped off signal from the alternating voltage to tie in with the phase of the electric field induced current, as will be described in more detail below).

When an object 10, is placed in the vicinity of the two electrodes 2, 4, the object terminates those field lines (in the situation shown in FIG. 1, field lines 11 and 12) that would otherwise pass through the space occupied by the object 10, thus reducing the current flowing from the electric field sensing reception electrode 4. Thus the current level measured by the current sensing circuit may be used as a measure of the presence of an object in the vicinity of the two electrodes 2, 4.

Figure 2:
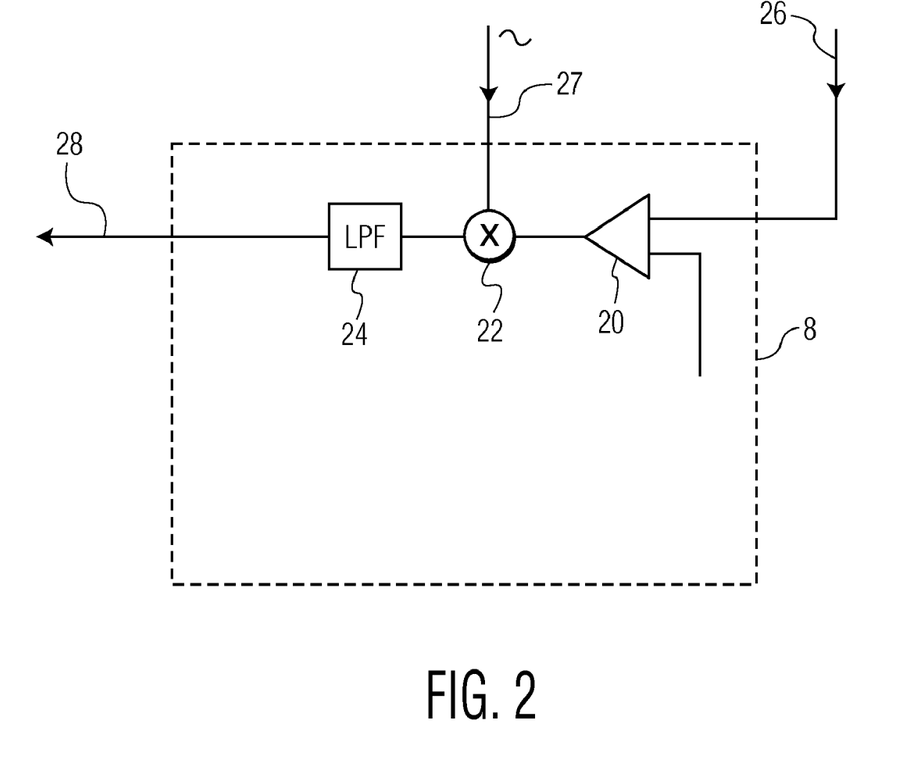
FIG. 2 is a block diagram showing functional modules of a conventional current sensing circuit of the system of FIG. 1.

FIG. 2 is a block diagram showing functional modules of the conventional current sensing circuit 8. The current sensing circuit 8 comprises an amplifier 20, a multiplier 22 and a low-pass filter 24. These functional modules may be implemented in any suitable form, for example using the circuit design disclosed in U.S. Pat. No. 6,025,726, the contents of which are contained herein by reference.

In operation, the displacement current 26 induced in the electric field sensing reception electrode 4 is amplified by the amplifier 20 and multiplied by the multiplier 22 with a tapped-off and phase shifted (by a phase shift module that is not shown) version 27 of the voltage applied to the electric field sensing transmitting electrode 2. The tapped-off voltage is phase shifted so as to render the phase the same as that of the displacement current 26. Thus, if we assume here that the amplifier 20 is ideal, i.e. does not introduce any additional phase shifts to the displacement current 26, then the phase of the tapped-off voltage is shifted 90°. If, in practise, the amplifier 20 does introduce additional phase shifts to the displacement current 26, then the phase of the tapped-off voltage is adjusted as required to accommodate this.

The output from the multiplier 22 is then low-pass filtered to provide an output signal 28. The output signal 28 is thus a measure of the current induced in the electric field sensing reception electrode 4 by the electric field generated by the electric field sensing transmission electrode 2, and will vary in response to the object 10, being placed in the vicinity of the electric field sensing electrodes 2,4. The output signal 28 is then processed by external electronics (not shown), as required.

Figure 3:
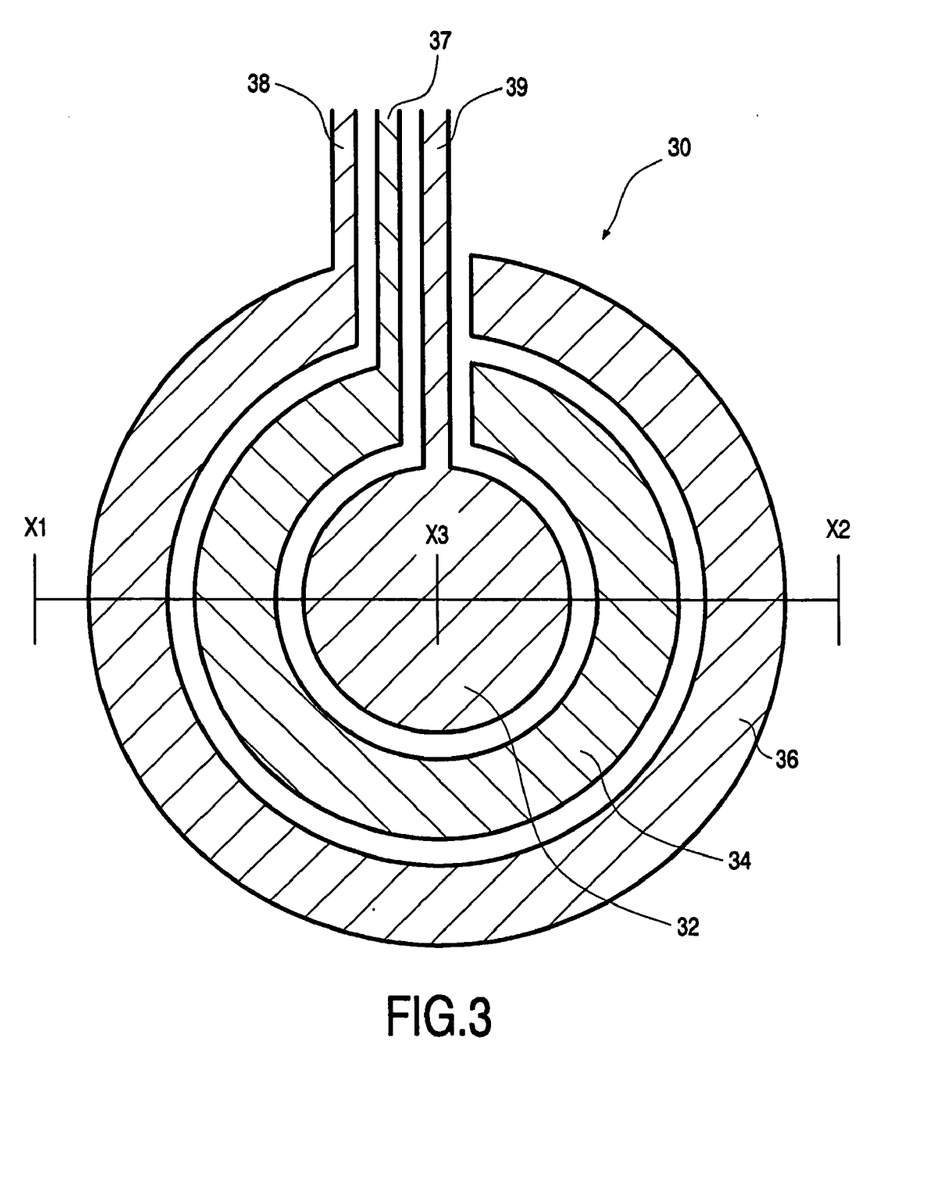
FIG. 3 shows an electrode arrangement (not to scale) of an object sensing system.

FIG. 3 shows an electrode arrangement 30 (not to scale) of an object sensing system according to a first embodiment of the present invention. The electrode arrangement comprises an electric field sensing reception electrode 32, an inner electric field sensing transmission electrode 34, and an outer electric field sensing transmission electrode 36. The electric field sensing reception electrode has a substantially circular shape, (i.e. a filled in circle).

The inner electric field sensing transmission electrode 34 is of a substantially annular ring shape around the electric field sensing reception electrode 32. The outer electric field sensing transmission electrode 36 is of a substantially annular ring shape around the inner electric field sensing transmission electrode 34. Thus the two transmission electrodes 34, 36 are concentric relative to each other, and also to the electric field sensing reception electrode 32.

Each of these electrodes is provided with a lead out or contact portion so that they can be connected to separate parts of the control circuitry, as follows. The electric field sensing reception electrode 32 is provided with a reception electrode contact 37. The inner electric field sensing transmission electrode 34 is provided with an inner transmission electrode contact 38. The outer electric field sensing transmission electrode 36 is provided with an outer transmission electrode contact 39. Breaks are provided in the annular ring form of each of the electric field sensing transmission electrodes 32, 34 to enable the contacts 37, 38, 39 to be lead out of the arrangement. It will be appreciated that other contact arrangements may be provided instead, for example contacts may be made using via holes (in which case complete annular rings may be formed).

For clarity, FIG. 3 is not drawn to scale, in particular with respect to the relative sizes of the electrodes compared to the spaces between them and to the widths of the contacts. The sizes of the elements described will be chosen by the skilled person according to a number of factors, including fabrication capabilities, and the typical sizes of the objects intended to be sensed.

In this embodiment the arrangement is intended to be used for fingerprint sensing. The dimensions used in this embodiment are as follows:

Radius of the electric field sensing reception electrode 32: 40 μm

Figure 4:
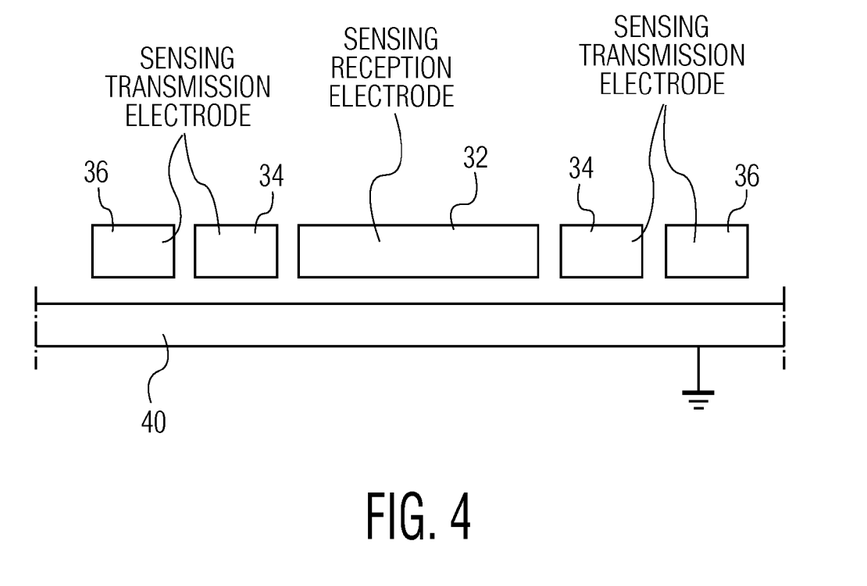
FIG. 4 shows the electrode arrangement of FIG. 3 in cross-section through the line $X_1$-$X_2$ of FIG. 3.

Inner radius of the inner electric field sensing transmission electrode 34: 60 μm Outer radius of the inner electric field sensing transmission electrode 34: 73 μm Inner radius of the outer electric field sensing transmission electrode 36: 93 μm Outer radius of the outer electric field sensing transmission electrode 36: 101 μm Annular spaces between the respective electrodes: 20 μm and 19 μm Widths of the contacts: 20 μm FIG. 4 shows the electrode arrangement 30 in cross-section through the line $X_1$-$X_2$ of FIG. 3. As will be understood from the description associated with FIG. 3, along the cross-section $X_1$-$X_2$ there are two portions of the inner electric field sensing transmission electrode 34 and two portions of the outer electric field sensing transmission electrode 36, as shown. Also shown in cross-section in FIG. 4 is a ground plane 40 provided beneath the electric field sensing electrodes 32, 34, 36.

The electric field sensing electrodes 32, 34, 36 and the ground plane 40 may be fabricated in any convenient manner. Here they are formed by depositing the electric field sensing electrodes 32, 34, 36 on a top side of a glass plate (not shown), with the ground plane 40 being deposited on the bottom side of the same glass plate.

Figure 5:
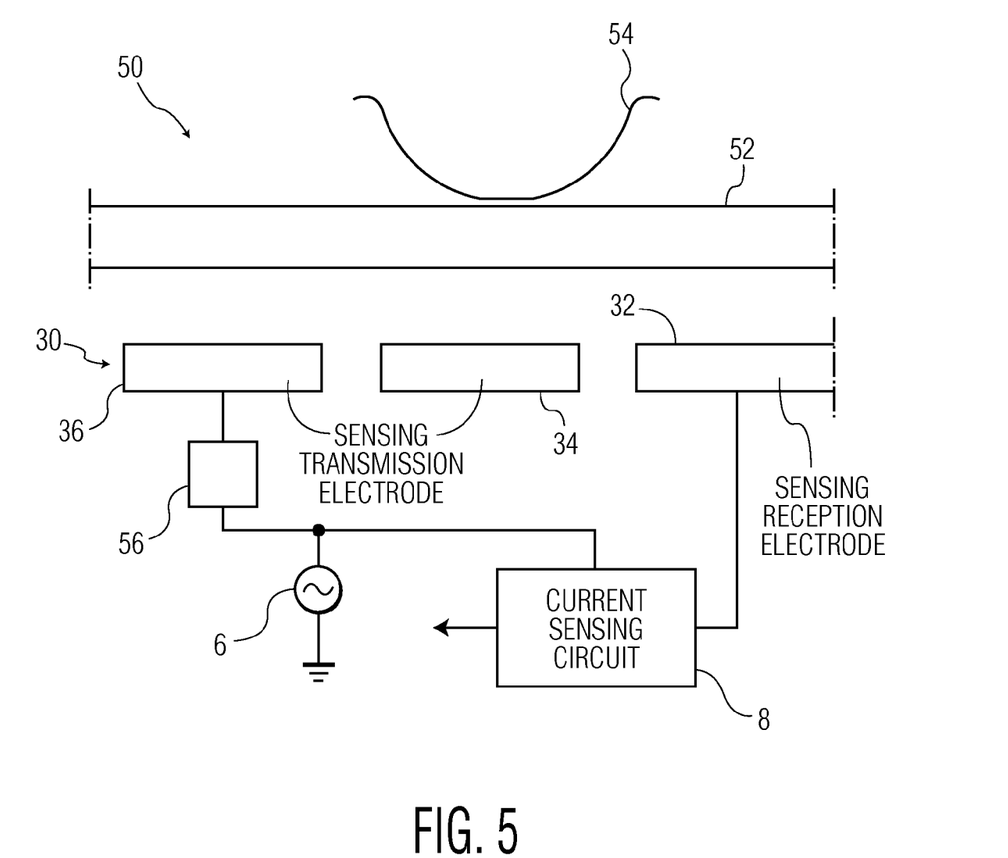
FIG. 5 shows an object sensing system.

FIG. 5 shows an object sensing system 50 according to a first embodiment of the present invention. The same reference numerals have been used to describe the same elements as those already described above. The object sensing system 50 comprises a plurality of electrode arrangements, each of the type and shape described above, i.e. comprising a respective electric field sensing reception electrode 32, inner electric field sensing transmission electrode 34 and outer electric field sensing transmission electrode 36 as shown in FIGS. 3 and 4. The respective electrode arrangements are arranged in a matrix. For clarity, only one such electrode arrangement 30 is shown in FIG. 5. Further for clarity, only part of the electric field sensing reception electrode 32 is shown, and only one of each of the two annular portions (as described above with reference to FIG. 4) of the inner electric field sensing transmission electrode 34 and the outer electric field sensing transmission electrode 36 are shown (i.e. the parts shown correspond to a cross-section through the line $X_1$-$X_3$ of FIG. 3, rather than the whole of the line $X_1$-$X_2$ of FIG. 3).

As shown in FIG. 5, a glass plate 52 is positioned above the electrode arrangement 30. Objects to be sensed may are positioned against or near the glass plate 52. In the example shown in FIG. 5, a finger tip is pressed against the glass plate 52. One ridge of the fingerprint profile of the finger tip is shown in FIG. 5 pressed against the glass plate 52 in the vicinity of the electrode arrangement 30. By virtue of the owner of the finger pressing his or her whole finger tip on the glass plate 52, other ridges of the finger tip (not shown) are at the same time pressed against the glass plate at other locations on the glass plate 52, i.e. corresponding to other electrode arrangements of the matrix of electrode arrangements.

The electric field sensing reception electrode 32 and the inner electric field sensing transmission electrode 34 are coupled to an alternating voltage source 6 and a current sensing circuit 8 in the same way as was described above with reference to FIGS. 1 and 2.

The alternating voltage source 6 is also coupled to the inner electric field sensing transmission electrode 36, but via an inverter circuit 56.

A ground plane corresponding to the ground plane 40 described above with reference to FIG. 4 is also included below the electrode arrangement 30, but for clarity this is not shown in FIG. 5. This ground plane is preferable for achieving best sharpness of the positional localisation, but may be omitted if desired.

The operation of the object sensing system 50 will be explained with reference to FIG. 6, which illustrates qualitatively the different alternating voltages provided to the inner and outer electric field sensing transmission electrodes.

Figure 6:
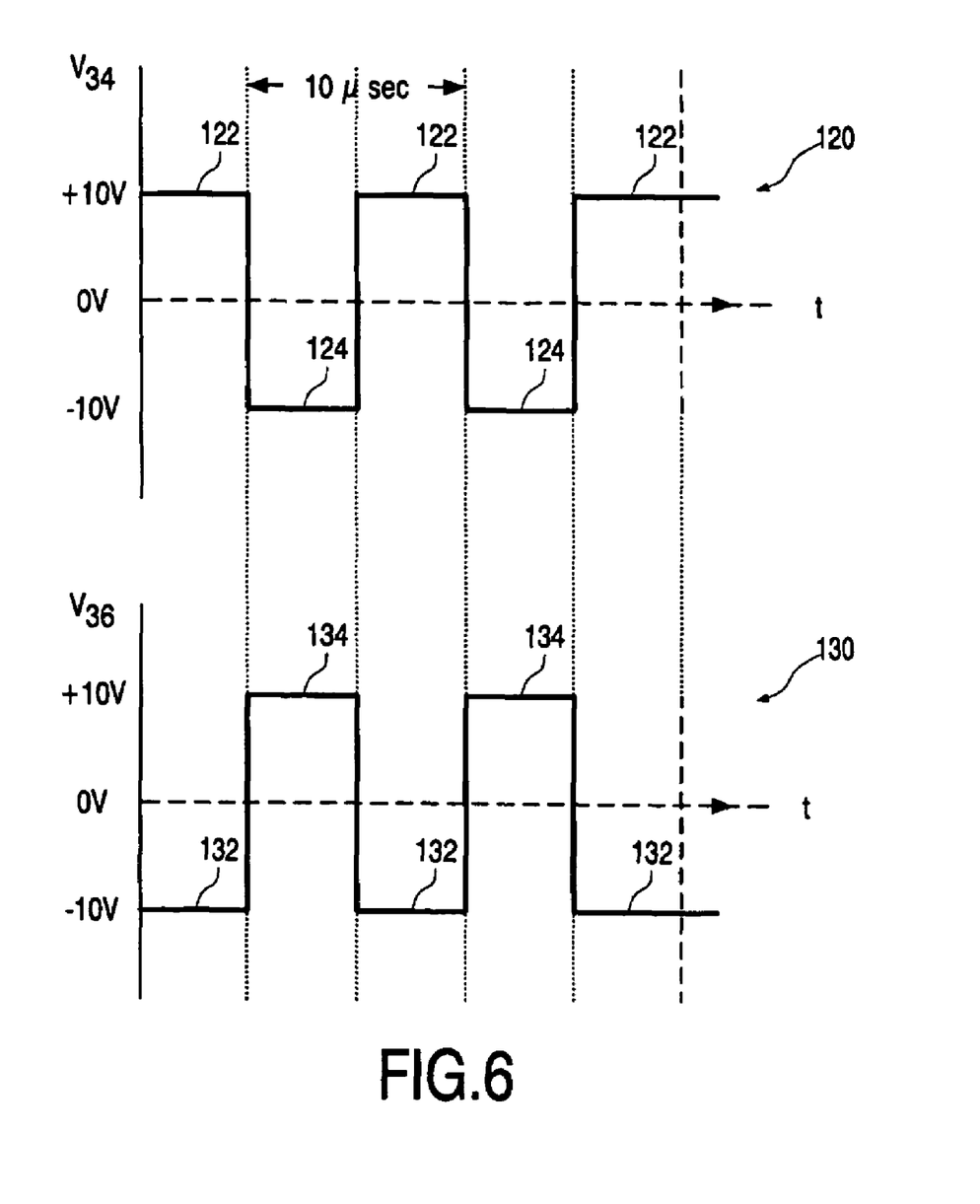
FIG. 6 illustrates qualitatively different alternating voltages provided to certain electric field sensing transmission electrodes.

FIG. 6 shows a plot 120 of the alternating voltage $V_{34}$ output by the alternating voltage source 6 and applied directly to the inner electric field sensing transmission electrode 34. In this embodiment this alternating voltage is a bipolar square wave of +/−10V and frequency 100 kHz. Indicated in FIG. 6 are the positive parts 122 and the negative parts 124 of the cycle of the alternating voltage $V_{34}$.

The inverter circuit 56 inverts the alternating voltage provided by the alternating voltage source 6 and the inverted output is fed to the outer electric field sensing transmission electrode 36. FIG. 6 shows a plot 130 of this inverted alternating voltage $V_{36}$. Indicated in FIG. 6 are the negative parts 132 and the positive parts 134 of the cycle of the inverted voltage $V_{36}$.

Thus, considering now the inner and outer electric field sensing transmission electrodes, it is apparent that when the inner electric field sensing transmission electrode 34 is being driven by the positive part of 122 of the cycle of the alternating voltage $V_{34}$, the outer electric field sensing transmission electrode 36 is being driven by the negative part 132 of the cycle of the inverted voltage $V_{36}$. Likewise, when the inner electric field sensing transmission electrode 34 is being driven by the negative part of 124 of the cycle of the alternating voltage $V_{34}$, the outer electric field sensing transmission electrode 36 is being driven by the positive part 134 of the cycle of the inverted voltage $V_{36}$. In other words, the two transmission electrodes are driven with opposite polarity alternating voltages relative to each other. This may be termed operating in antiphase.

As explained above with reference to FIGS. 1 and 2, the electric field produced by the inner electric field sensing transmission electrode 34 due to the application of the alternating voltage $V_{34}$ produces a current 26 output from the electric field sensing reception electrode 32 which is modified by the fingerprint ridge 54. This is input to the amplifier 20, multiplied by the multiplier 22 with a tapped off and phase-shifted version 27 of the voltage V34, then low-pass filtered to provide the output signal 28.

However, here the electric field produced by the outer electric field sensing transmission electrode 36 due to the application of the inverted voltage $V_{36}$ also produces a contribution to the current 26 output from the electric field sensing reception electrode 32 which is modified by the fingerprint ridge 54. Thus, during the operation of the object sensing system 50, this contribution to the current 26 is also being input to the amplifier 20, multiplied by the multiplier 22 with the tapped off and phase-shifted version 27 of the voltage V34, then low-pass filtered to provide its contribution to the output signal 28.

The contribution made by inner electric field sensing transmission electrode 34 to the current 26 provides a positive contribution to the output signal 28 when multiplied by the multiplier 22.

However, the voltage applied to the outer electric field sensing electrode 36 is inverted compared to the voltage applied to the inner electric field sensing electrode 34. Thus, the contribution made by outer electric field sensing transmission electrode 36 to the current 26 provides a negative, rather than positive, contribution to the output signal 28 when multiplied by the multiplier 22. Thus the effect is for the contribution of the outer electric field sensing transmission electrode 36 to modify the contribution due to the inner electric field sensing transmission electrode 34. This modification is such as to improve the dependency of the overall output signal 28 on the position of the object being sensed, in this case the fingerprint ridge 54, relative to the position of the electric field sensing reception electrode 32.

Thus, an effect of providing the additional electric field sensing transmission electrode 36 driven with inverted voltage (compared to the conventional arrangement shown in FIG. 1) is to provide increased positional sensing, as the sensing output 28 from the current sensing circuit 8 due to the field provided by the inner electric field sensing transmission electrode 34 is modified by the field provided by the additional outer electric field sensing transmission electrode 36.

This effect makes use of the property that electrostatic interaction falls off with distance. Directly above the receive electrode, the potential (or electric field strength) is dominated by the voltage on the inner transmission electrode because this electrode is nearest in all directions. However, moving away from the centre, the potential (or electric field strength) from the inner electrode diminishes quicker than the (negative) contribution from the outer transmitter electrode because the latter is bigger. This means that the net signal falls off quicker than would otherwise be the case. Yet further away from the centre (beyond both electrodes) the contribution from both the inner and other electrode tends to zero and the overall (net) signal falls to zero. Hence by appropriate balancing of the contribution from the inner and outer electrodes, the sensitivity profile can be changed.

Further consideration is now given to the extent of positional precision offered by theses arrangements, in terms of positions in an "x-y" plane parallel to the plane of the electric field sensing electrodes 32, 34, 36 (i.e. at a fixed "z" distance from the plane, where x, y and z are orthogonal axes).

By use of a mathematical model, an object response curve indicating a theoretical normalised signal (i.e. change in the output 28 due to the presence of an object) as a function of the position of the object relative to the electric field sensing reception electrode can be calculated for an idealised radially symmetric arrangement. More particularly, a circular electric field sensing reception electrode is considered, with two circular concentric rings providing an inner and outer electric field sensing transmission electrode respectively.

Figure 7:
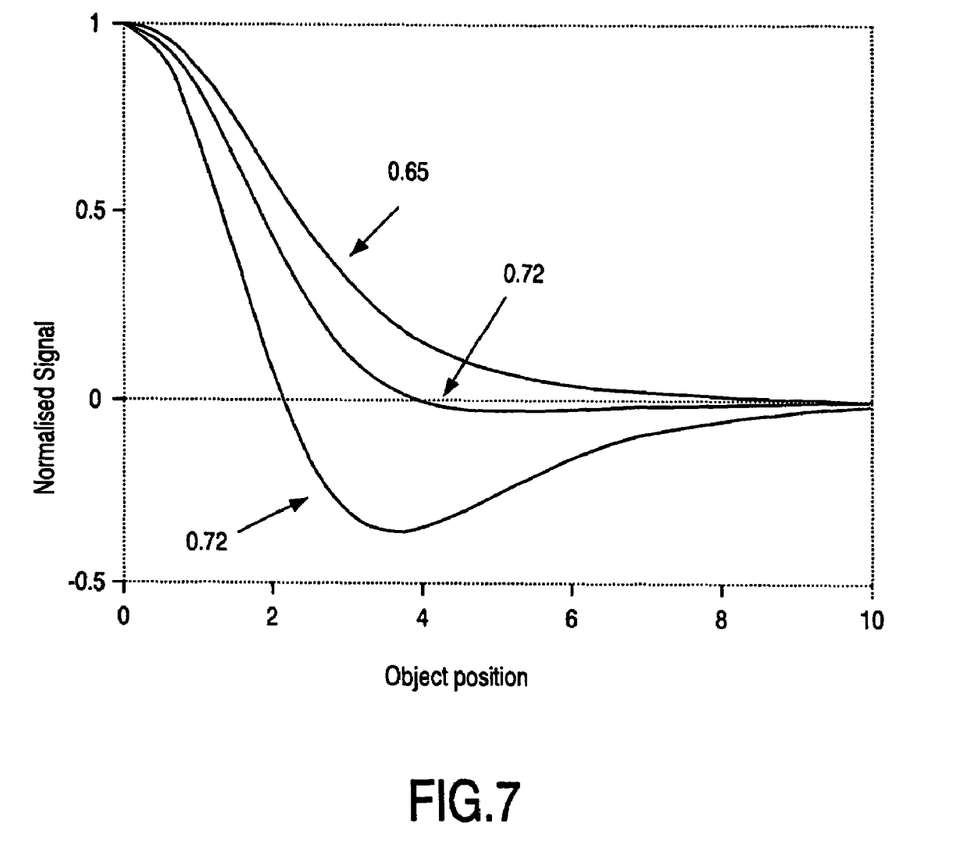
FIG. 7 shows results of calculation of an object response curve indicating a theoretical normalised signal as a function of a position of an object relative to an electric field sensing reception electrode for an idealised radially symmetric arrangement of electric field sensing electrodes.

FIG. 7 shows the results of one such theoretical calculation of normalised signal against object position, the object position being defined in relative units. The calculation was performed for an idealised situation in which:

the radius of the circular electric field sensing reception electrode=the inner radius of the inner electric field sensing transmission electrode =1;

the outer radius of the inner electric field sensing transmission electrode=the inner radius of the outer electric field sensing transmission electrode=1.5; and the outer radius of the outer electric field sensing transmission electrode=2.

For a given set of dimensions, different results for normalised signal against object position are achieved for different relative magnitudes of the two voltages applied to the two electric field sensing transmission electrodes. (Note that although, in the embodiment described above, the same magnitude of voltage was applied to both the inner and outer electric field sensing transmission electrodes (see e.g. FIG. 6), this need not be the case, and in other embodiments different magnitudes may be applied using appropriate circuitry provided as part of the inverter circuit 56 or elsewhere in the overall system, as desired.) FIG. 7 shows the results for three different calculations based on respective ratios of $V_{36}/V_{34}$ (strictly speaking ratio of the magnitudes)=0.65, 0.72 and 0.75 as shown in FIG. 7.

The response curves flatten off with decreasing value of $V_{36}/V_{34}$, (e.g. $V_{36}/V_{34}$=0.65) i.e. in effect the inner electric field sensing transmission electrode dominates and the response tends back to the conventional single transmission electrode arrangement.

As a corollary, the response curves for increasing value of $V_{36}/V_{34}$, (e.g. $V_{36}/V_{34}$=0.75), are sharper, but also display a negative dip i.e. in effect the outer electric field sensing transmission electrode dominates.

Thus the optimum response (in this example) is achieved for $V_{36}/V_{34}$=0.72, as the curve for this value falls off sharply with distance but does not include a negative dip. Indeed the curve for $V_{36}/V_{34}$=0.72 corresponds to a $1/r^{12}$ curve, providing greatly improved positional precision over conventional arrangements.

Thus different response characteristics can be achieved or attempted by optimising or otherwise selecting the relative voltage magnitudes applied to the two electric field sensing transmission electrodes. Alternatively, this may also be achieved by optimising or otherwise selecting the dimensions of the various electric field sensing electrodes accordingly. Yet another alternative is to select or vary electrode dimensions and voltages in combination.

In this embodiment a plurality of electrode arrangements 30 are provided in a matrix. The outputs 28 from each electrode arrangement 30 are processed in combination in any suitable manner by further control and processing circuitry (not shown) according to the object sensing operation being carried out, in this case fingerprint sensing and analysis.

One advantage of the above described arrangement is that the sensing takes place without the object needing to be placed directly against the sensing electrodes. For example, referring to FIG. 5, the finger can be pressed against the glass plate 52, which can be separated from the electric field sensing electrodes 32, 34, 36, thus offering these electrodes protection from physical and corrosive damage.

In the above embodiment, the dimensions of the various electrodes are as described. Other dimensions may be used as required for other applications. For example the electric field sensing reception electrode, the inner transmission electrode and the outer electric field sensing transmission electrode may all be of different radii compared to each other, or any two of these may be the same as each other or all three may be the same. Also, the absolute sizes may be different compared to those described above.

In the above embodiment, the inner electric field sensing transmission electrode and the outer electric field sensing transmission electrode were in the form of concentric rings around the centrally positioned circular electric field sensing reception electrode. However, shapes other than rings may be employed, arranged in a concentric layout. In other words, the reception electrode may be any desired block shape (by which is meant a filled in shape as opposed to annular), e.g. square, rectangle, triangle, irregular shape etc., with the transmission electrodes being any desired annular shape around that, the outer transmission electrode being an annular shape around the inner transmission electrode which is itself around the reception electrode.

Another possibility is that an electric field sensing reception electrode, a first electric field sensing transmission electrode and a second electric field sensing transmission electrode are provided, but arranged in any convenient arrangement, i.e. not necessarily concentric. In this case, any suitable layout of electrodes may be employed, with the drive voltage supplied to the second electric field sensing transmission electrode being to some extent (or fully) inverted, of opposite polarity or antiphase compared to the drive voltage supplied to the first electric field sensing transmission electrode.

In the above described embodiments one additional electric field sensing transmission electrode is provided in addition to a first or conventional electric field sensing transmission electrode. In other embodiments, further additional electric field sensing transmission electrodes may be provided to further modify the positional sensing effect of the output from the first conventional electric field sensing transmission electrode. These further additional electric field sensing transmission electrodes are also driven with a drive voltage that is to some extent (or fully) inverted, of opposite polarity or antiphase compared to the drive voltage supplied to the first electric field sensing transmission electrode. In the case of annular arrangements, these further electric field sensing transmission electrodes may be in the form of further annular shapes. For example, in the case where the first and second electric field sensing transmission electrodes are annular rings, these further electric field sensing transmission electrodes are preferably further annular rings. Also, for any of these possibilities, one or more further electric field sensing transmission electrodes may be driven with the same drive voltage as the drive voltage supplied to the first electric field sensing transmission electrode.

In the above described embodiment, the form of the drive voltages is a described with reference to FIG. 6. In other embodiments, other values and/or forms may be used. For example, other amplitudes may be used for either or both of the electric field sensing transmission electrodes. Likewise, other frequencies may be used. In the above embodiments, the waveform is a square wave. Other alternating waveforms may be used, for example sine wave.

In the above embodiments, the drive voltage supplied to the second electric field sensing transmission electrode is to some extent (or fully) inverted, of opposite polarity, or is antiphase, compared to the drive voltage supplied to the first electric field sensing transmission electrode. In the above embodiments, this is in the sense of each oscillation of the alternating cycle of the drive voltage that is applied to the first electric field sensing transmission electrode being replicated in inverse form in the drive voltage applied to the second electric field sensing transmission electrode. However it is not necessary that these drive voltages are applied simultaneously to the electrodes. The low pass filter 24 has an integrating time constant and a more general possibility is that within that time constant, both transmission electrodes are driven an equal amount of time, with each having the correct (phase or anti phase) relation to the reference signal 27. To take this point even further, yet another possibility is that the electrodes are driven in sequence with the same phase, but that the phase of the reference signal is altered when the outer electrode is driven, by switching in an additional phase delay.

In the above embodiments current sensing circuit 28 is employed to sense the displacement current induced in the electric field sensing reception electrode. However, any other suitable circuit or arrangement may be used for this. One possibility is to use current sensing circuits of a type forming the subject matter of a pending patent application of the present applicant, i.e. U.S. application Ser. No. 10/153261 with applicant's reference PHGB010089, the subject matter of which is incorporated herein by reference.

In the above embodiments the object sensing system is used as part of a fingerprint sensing and analysing system. However, the present invention is not limited to such use, and may be employed as a stand-alone object sensing system or as part of any other process or system incorporating object sensing.

Furthermore, the term "object" is not limited to discrete objects that need to be sensed in full, rather this term encompasses features or elements of a larger object that may be individually resolved or sensed, for example one or more ridges of a fingerprint of a finger, as described in the main embodiment above. Another possibility is that by sensing a particular feature of a given object, the orientation of the given object may be derivable.

The object sensing system may be incorporated in, or with, a display device or system, to provide a user input or interaction means. For example, the object sensing system may be incorporated on the inside of an active matrix liquid crystal display device, constructed and operated for example along the lines of the liquid crystal display device disclosed in U.S. Pat. No. 5,130,829, the contents of which are contained herein by reference. In this case, the above mentioned current sensing circuits of the type forming the subject matter of pending U.S. application Ser. No. 10/153261, incorporated herein by reference, may be used to particular benefit.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

The invention claimed is:

1. An object sensing system, comprising:
    an electric field sensing electrode arrangement, the electrode field sensing electrode arrangement comprising:
        a first electrode arranged as an electric field sensing reception electrode,
        a second electrode arranged as a first electric field sensing transmission electrode, and
        a third electrode arranged as a second electric field sensing transmission electrode;
    driving circuitry arranged to supply a first alternating voltage to the first electric field sensing transmission electrode and a second alternating voltage to the second electric field sensing transmission electrode, the second alternating voltage comprising at least some antiphase portions compared to the first alternating voltage; and
    sensing circuitry arranged to process currents, induced in the electric field sensing reception electrode by electric fields generated by the first and second electric field sensing transmission electrodes when driven by the first and second alternating voltages respectively, to detect changes in the induced current due to an object positioned in the electric fields.

2. A system according to claim 1, wherein the second alternating voltage is an inverted form of the first alternating voltage.

3. A system according to claim 1, wherein the first and second electric field sensing transmission electrodes are substantially annular ring shaped, the first electric field sensing transmission electrode being positioned substantially around the electric field sensing reception electrode, and the second electric field sensing transmission electrode being positioned substantially around the first electric field sensing transmission electrode.

4. A system according to claim 1, wherein the electric field sensing reception electrode is substantially a block shape, and the first and second electric field sensing transmission electrodes are substantially annular shaped, the first electric field sensing transmission electrode being positioned substantially around the electric field sensing reception electrode, and the second electric field sensing transmission electrode being positioned substantially around the first electric field sensing transmission electrode.

5. A system according to claim 1, wherein the electric field sensing reception electrode is substantially a circle shape, and the first and second electric field sensing transmission electrodes are substantially annular ring shaped, the first electric field sensing transmission electrode being positioned substantially around the electric field sensing reception electrode, and the second electric field sensing transmission electrode being positioned substantially around the first electric field sensing transmission electrode.

6. A system according to claim 1, wherein the electrode field sensing electrode arrangement further comprises one or more further electrodes arranged as further electric field sensing transmission electrodes.

7. A system according to claim 1, wherein the system further comprises one or more further electric field sensing electrode arrangements, which along with the electric field sensing electrode arrangement are arranged in a matrix, and corresponding sensing circuitry.

8. A method of sensing objects, comprising:
providing an electric field sensing electrode arrangement, the electrode field sensing electrode arrangement comprising:
  a first electrode arranged as an electric field sensing reception electrode,
  a second electrode arranged as a first electric field sensing transmission electrode, and
  a third electrode arranged as a second electric field sensing transmission electrode;
supplying a first alternating voltage to the first electric field sensing transmission electrode and a second alternating voltage to the second electric field sensing transmission electrode, the second alternating voltage comprising at least some antiphase portions compared to the first alternating voltage; and
processing currents induced in the electric field sensing reception electrode by electric fields generated by the first and second electric field sensing transmission electrodes when driven by the first and second alternating voltages respectively; and
detecting changes in the induced current due to an object positioned in the electric fields.

9. A method according to claim. 8, wherein the second alternating voltage is an inverted form of the first alternating voltage.

10. A method according to claim 8, wherein the first and second electric field sensing transmission electrodes are substantially annular ring shaped, the first electric field sensing transmission electrode being positioned substantially around the electric field sensing reception electrode, and the second electric field sensing transmission electrode being positioned substantially around the first electric field sensing transmission electrode.

11. A method according to claim 8, wherein the electric field sensing reception electrode is substantially a block shape, and the first and second electric field sensing transmission electrodes are substantially annular shaped, the first electric field sensing transmission electrode being positioned substantially around the electric field sensing reception electrode, and the second electric field sensing transmission electrode being positioned substantially around the first electric field sensing transmission electrode.

12. A method according to claim 8, wherein the electric field sensing reception electrode is substantially a circle shape, and the first and second electric field sensing transmission electrodes are substantially annular ring shaped, the first electric field sensing transmission electrode being positioned substantially around the electric field sensing reception electrode, and the second electric field sensing transmission electrode being positioned substantially around the first electric field sensing transmission electrode.

13. A method according to claim 8, wherein the electrode field sensing electrode arrangement further comprises one or more further electrodes arranged as further electric field sensing transmission electrodes.

14. A method according to claim 8, wherein the system further comprises one or more further electric field sensing electrode arrangements, which along with the electric field sensing electrode arrangement are arranged in a matrix, and corresponding sensing circuitry.

* * * * *